United States Patent
Liang et al.

(10) Patent No.: US 10,496,733 B2
(45) Date of Patent: Dec. 3, 2019

(54) INFORMATION SHARING METHOD, APPARATUS AND COMPUTER DEVICE

(71) Applicant: TENCENT TECHNOLOGY (SHENZHEN) COMPANY LIMITED, Shenzhen (CN)

(72) Inventors: Zhu Liang, Shenzhen (CN); Xin Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1006 days.

(21) Appl. No.: 14/263,258

(22) Filed: Apr. 28, 2014

(65) Prior Publication Data
US 2014/0237335 A1 Aug. 21, 2014

(30) Foreign Application Priority Data
Apr. 17, 2012 (CN) .......................... 2012 1 0112130

(51) Int. Cl.
*G06F 17/22* (2006.01)
*H04L 29/08* (2006.01)
(Continued)

(52) U.S. Cl.
CPC ........ *G06F 17/2235* (2013.01); *H04L 65/403* (2013.01); *H04L 67/306* (2013.01); *H04W 4/21* (2018.02)

(58) Field of Classification Search
None
See application file for complete search history.

(56) References Cited

U.S. PATENT DOCUMENTS 7,730,216 B1 * 6/2010 Issa .................... H04L 67/104
                                                                               709/214
8,799,658 B1 * 8/2014 Sellier ................... G06F 21/10
                                                                               713/172
(Continued)

FOREIGN PATENT DOCUMENTS

CN          101079847       11/2007
CN          101901256 A    12/2010
(Continued)

OTHER PUBLICATIONS

Sharejosie, How to repost on Facebook, Apr. 11, 2011, Youtube. pp. 1-7 (Year: 2011).*
(Continued)

*Primary Examiner* — Howard Cortes
(74) *Attorney, Agent, or Firm* — Oblon, McClelland, Maier & Neustadt, L.L.P.

(57) ABSTRACT

Described is an information sharing method and apparatus, which are directed to information published by a user in a social network. For information published by a user in a social network, when a sharing instruction of the user is received, a selection box comprising one or more sharing targets is displayed for the user, each sharing target has its corresponding social network, and the social network corresponding to the sharing target includes a social network which published the information; when a submission instruction of the user is received, the information is sent to a sharing target selected by the user from the selection box. By using the present method, the spread of information can be accelerated, and the implementation is simple and convenient.

20 Claims, 3 Drawing Sheets

(51) Int. Cl.
*H04L 29/06* (2006.01)
*H04W 4/21* (2018.01)

(56) References Cited

U.S. PATENT DOCUMENTS

| | | | | |
|---|---|---|---|---|
| 9,064,236 | B2* | 6/2015 | Gazetov | G06Q 10/101 |
| 9,871,757 | B1* | 1/2018 | Reardon | H04L 51/32 |
| 10,217,117 | B2* | 2/2019 | Heath | G06Q 30/02 |
| 2007/0233692 | A1* | 10/2007 | Lisa | G06F 17/30651 |
| 2008/0027909 | A1* | 1/2008 | Gang | G06F 17/30873 |
| 2009/0158176 | A1* | 6/2009 | Kalaboukis | H04L 12/1822 |
| | | | | 715/758 |
| 2009/0234876 | A1* | 9/2009 | Schigel | G06F 17/30873 |
| 2010/0153284 | A1 | 6/2010 | Hoag et al. | |
| 2010/0274887 | A1 | 10/2010 | Sanghavi | |
| 2011/0066636 | A1* | 3/2011 | Guido | G06F 17/241 |
| | | | | 707/769 |
| 2011/0258535 | A1* | 10/2011 | Adler | G06F 17/214 |
| | | | | 715/235 |
| 2012/0030587 | A1 | 2/2012 | Ketkar | |
| 2012/0110064 | A1* | 5/2012 | Chen | G06Q 10/10 |
| | | | | 709/203 |
| 2012/0150661 | A1* | 6/2012 | DeStein | G06Q 30/0276 |
| | | | | 705/14.72 |
| 2012/0151322 | A1* | 6/2012 | Lindsay | H04L 51/32 |
| | | | | 715/234 |
| 2012/0151383 | A1* | 6/2012 | Kazan | G06Q 10/101 |
| | | | | 715/753 |
| 2012/0290953 | A1* | 11/2012 | Russell | H04N 21/4756 |
| | | | | 715/758 |
| 2012/0311509 | A1* | 12/2012 | Maggiotto | G06F 3/04817 |
| | | | | 715/863 |
| 2013/0132177 | A1* | 5/2013 | Ha | G06Q 30/02 |
| | | | | 705/14.19 |
| 2013/0173634 | A1* | 7/2013 | Shaban Hussein | G06F 17/30165 |
| | | | | 707/748 |
| 2013/0191762 | A1* | 7/2013 | Rajagopalan | H04L 12/1818 |
| | | | | 715/753 |
| 2013/0246522 | A1* | 9/2013 | Bilinski | H04N 21/4758 |
| | | | | 709/204 |
| 2014/0237335 | A1* | 8/2014 | Liang | G06F 17/2235 |
| | | | | 715/205 |
| 2016/0275193 | A1* | 9/2016 | Abrams | G06F 17/30867 |

FOREIGN PATENT DOCUMENTS

| | | |
|---|---|---|
| CN | 102270085 | 12/2011 |
| JP | 2008217255 A | 9/2008 |
| JP | 2009199368 A | 9/2009 |
| JP | 2011108094 A | 6/2011 |
| JP | 2012069110 A | 4/2012 |

OTHER PUBLICATIONS

Office Action issued in corresponding Chinese Application No. 201210112130.5 dated Mar. 2, 2015 with a Concise English Explanation.

Office Action Issued in corresponding JP Application No. 20149542709 dated Jun. 30, 2015.

* cited by examiner

INFORMATION SHARING METHOD, APPARATUS AND COMPUTER DEVICE

CROSS REFERENCE TO RELATED APPLICATIONS

This application is a U.S. continuation application under 35 U.S.C. § 111(a) claiming priority under 35 U.S.C. §§ 120 and 365(c) to International Application No. PCT/CN2013/074289 filed Apr. 17, 2013, which claims the priority benefit of Chinese Patent Application No. 201210112130.5 filed Apr. 17, 2012, the contents of which are incorporated by reference herein in their entirety for all intended purposes.

FIELD

The present disclosure relates to network technologies, more specifically, to an information sharing method, apparatus and computer device.

BACKGROUND

The section provides background information related to the present disclosure which is not necessarily prior art.

In the related art, a variety of different social networks (such as micro-blog) are supplied for users, to make the users make friends through the social networks.

Presently, the information posted by a certain user on a social network only can be seen by other users (such as the user's friends) on the same social network. If the user wants the information to be seen by the user's friends on other social networks, the user only adopts the following approach: the user logs into the other social networks to post the information to make the user's friends see the posted information. However, the approach is inconvenient and could not contribute to promote information.

SUMMARY

Accordingly, there provides an information sharing method and an information sharing apparatus, which may accelerate dissemination of information, and easy to implement.

An information sharing method includes:

receiving a sharing instruction sent by a client user;

displaying a selection box comprising one or more sharing targets; each sharing target corresponding to one social network, and social networks, corresponding to the one or more sharing targets, comprising a social network where a preset information is published;

receiving a selection of one sharing target from the selection box; and sending the preset information to the sharing target selected from the selection box when receiving a submission instruction from the client user.

An information sharing apparatus, includes:

a processing module configured to receive a sharing instruction sent by a client user, display a selection box comprising one or more sharing targets; each sharing target corresponding to one social networks, and social networks, corresponding to one or more sharing targets, comprising a social network where a preset information is published;

a sharing module configured to receive a selection of one sharing target from the selection box, and send the preset information to the sharing target selected from the selection box when receiving a submission instruction from the client user.

A computer device, comprising: a processor, a memory, and a display screen, wherein the memory stores computer instructions, to make the processor implement the following operations:

receiving a sharing instruction sent by a client user;

displaying a selection box comprising one or more sharing targets; each sharing target corresponding to one social network, and social networks, corresponding to the one or more sharing targets, comprising a social network where a preset information is published;

receiving a selection of one sharing target from the selection box; and sending the preset information to the sharing target selected from the selection box when receiving a submission instruction from the client user.

It can be seen that adopting the embodiments of the present invention, the user can share the information published on a certain social network to other social networks, which accelerates dissemination of information. Moreover, for the user, the user only implements some simple operations, such as sending relevance instructions, and the implementation is simple and convenient.

BRIEF DESCRIPTION OF THE DRAWINGS

In order to illustrate technical solutions according to embodiments of the disclosure, a brief description of drawings that assists the description of embodiments of the invention or existing art will be provided below. It would be apparent that the drawings in the following description are only for some of the embodiments of the invention. A person having ordinary skills in the art will be able to obtain other drawings on the basis of these drawings without paying any creative work.

FIG. 3 is a schematic diagram of a user X selecting object names;

FIG. 4 is a schematic diagram of N object names displayed by default in a notification list;

DETAILED DESCRIPTION OF ILLUSTRATED EMBODIMENTS

For problems of the related art, the present invention provides an information sharing solution that can accelerate the dissemination of information, and easy to implement.

Figure 1:
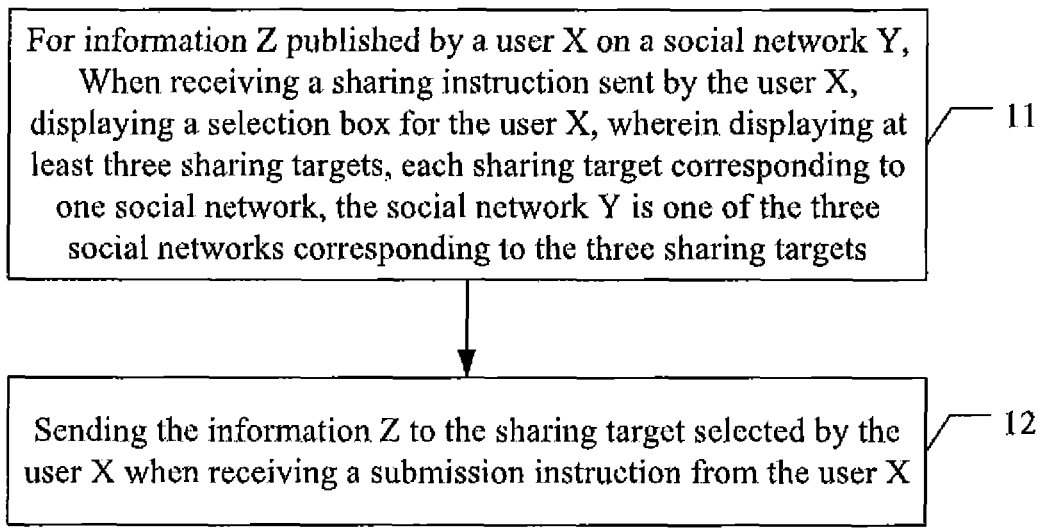
FIG. 1 is a flowchart of an example of an information sharing method according to various embodiments.

Referring to FIG. 1, it is a flowchart of an example of an information sharing method according to various embodiments. The information sharing method includes following steps.

Step 11: for information (named information Z) published by a user (named user X) on a social network (named social network Y), when receiving a sharing instruction sent by the user X, displaying a selection box for the user X. Wherein the selection box displays one sharing target or more sharing targets. Each sharing target corresponding to one social network. The social network Y where the information Z is published by the user X is included in the social networks corresponding to the displayed sharing targets.

Step 12: receiving a selection of one sharing target from the selection box, and sending the information Z to the sharing target selected by the user X from the selection box when receiving a submission instruction from the user X.

For easy description, in the embodiments of the present invention, the user X represents a user. The social network Y represents a social network. The information Z represents any information published in the social network Y.

In practice, each sharing target may be defined as the follow contents.

Friends of the user X in a first social network.

A personal space of the user X in a second social network. Or/And

A personal space of the user X in a third social network.

In practice, the first social network may be a QQ space. The second social network may be a micro-blog. The third social network may be a friend network.

A process shown in FIG. 1 will be described in detailed combined the following detailed examples.

For the information Z published by the user X in the social network Y, when receiving the sharing instruction from the user X, displaying the selection box of the sharing target for the user X. The selection box displays three different sharing targets which can be selected. Each sharing target respectively corresponds to one check box. The check box is at checked status by default.

Figure 2:
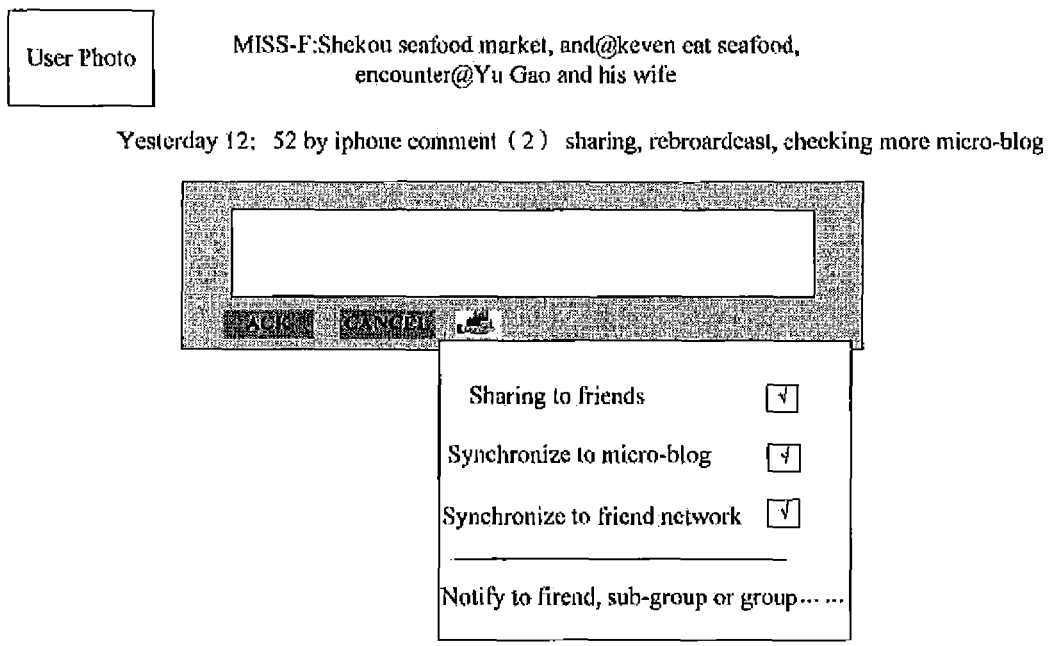
FIG. 2 is a schematic diagram of a sharing target selection box.

Referring to FIG. 2, it is schematic diagram of a sharing target selection box. For micro-blog information published by the user X, when the user X clicks a sharing button corresponds to the micro-blog information, displaying a sharing reason inputting box for the user X. The sharing reason inputting box is blank by default. The user X can input sharing reasons in the sharing reason inputting box. The input sharing reasons are shared to other social network with the micro-blog. The user X can input nothing in the sharing reason inputting box. When the user X hovers a mouse of a computer over an icon of a sharing target, namely, over a hand icon shown in FIG. 2, displaying a drop-down floating layer for the user X. That is, the drop-down floating layer is the sharing target selection box which displays three sharing targets. When the mouse of a computer pull away the icon of the sharing target or the drop-down floating layer for more than one second, the drop-down floating layer disappears. The right of the three sharing targets respectively displays one check box, which are at checked status by default. After the user X clicks a certain check box through the mouse, the mark "√" in the check box disappears, which denotes it is at a non-checked status.

In addition, a search link is displayed in the selection box, namely, "notifying some certain friends, sub-groups, or groups . . . " shown in FIG. 2 located below of the three sharing targets. If the sharing target selected by the user X is the friends of the user X in the first social network, and the user X clicks the search link, the search link can be converted into a search box, and the sharing target box displays object names of all users who have friend relationships with the user X in the QQ zone, to prompt the user X to select. The object names may include friend names, friend group names, group names, sub-group names. The specific meaning of each object name is known in the art. If the user X fails to input keywords in the search box, the information Z is sent to the user corresponding to the object names selected by the user X when receiving the submission instruction from the user X.

If the user X inputs the keywords in the search box, displaying the first social network for the user X. For example, in a social network, such as QQ zone, all object names with a friend relationship with the user X and the input keywords can be selected by the user X. When receiving the submission instruction from the user X, the information Z is sent to the users corresponding to the object name selected by the user X. The keywords input by the user X may be Chinese characters, English, Pinyin, or a combination of the Chinese characters, English, and Pinyin.

Figures 3, 4:
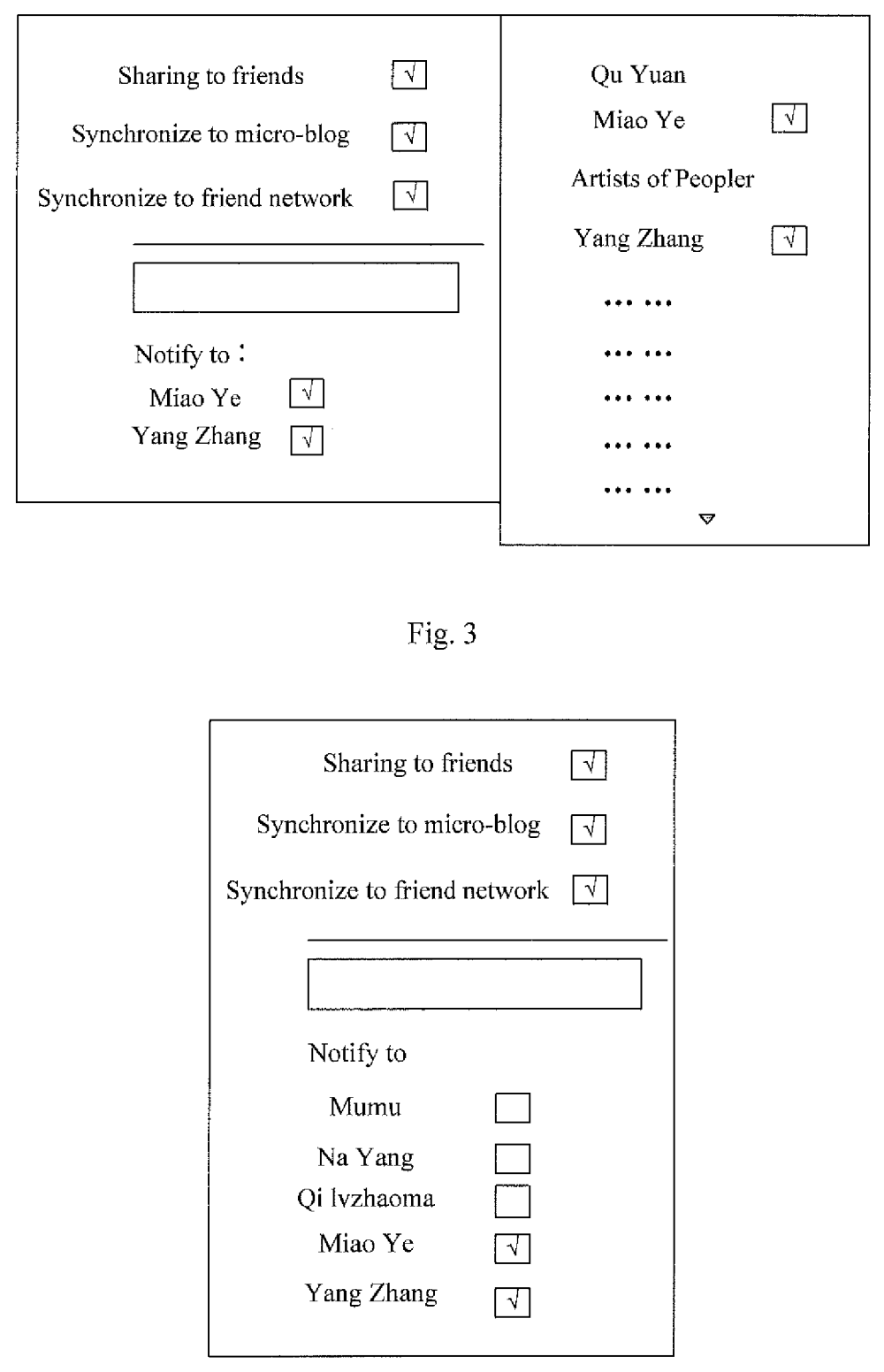

FIG. 3 is a schematic diagram of a user X selecting object names. If the sharing target selected by the user X is the friend of the user X in the first social network, and fails to input the keywords in the search box, the right side of the sharing target selection box displays the all object names with friend relationships with the user X in the first social network (such as QQ zone). If the user X inputs the keywords in the searching box, the right side of the selection box displays the all object names which have friend relationships with the user X and satisfy the input keywords in the QQ zone. If the user X moves the mouse of the computer across a certain object name, the right side of the selection box appears the check box. After the user X clicks the check box, the check box appears the mark "√", which denotes the object name is selected, and the check box is no longer disappears. If the object name is not selected, the check box will disappear. Further, referring to FIG. 3, a notification list can be displayed below the search box, namely, "notification to:", and displaying the selected object names and the corresponding check box in the notification list. The object names selected by the user X are saved in the notification list.

In addition, the notification list displays object names of N of the users who have received the information shared by the user X by default, to prompt the user X to select, A time interval between current time and information sharing time of each of the N users is the shortest. N is a positive integer, The value of the positive integer N can be set according to need, such as three. And, the N object names can be sorted in chronological order. Each object name corresponds to one check box, which is at the non-checked status by default. The user X selects one or several even all of the object names according to need. Of course, the user X can select nothing. If the user X has never shared information before, no contents are displayed by default.

Referring to FIG. 4, it is a schematic diagram of N (suppose N=3) object names displayed by default in a notification list. In FIG. 4, "Mu Mu", "Na Yang", and "Qi Lu Zhao Ma" are three object names displayed by default. The two object names "Miao Ye" and "Yang Zhang" are added into the notification list by the user X according to a way of FIG. 3.

For the micro-blog information shown in FIG. 2, when the user X finished all selection, namely, can send the submission instruction, the user X click the submit button shown in FIG. 2, Correspondingly, the micro-blog information is shared to the sharing target selected by the user X. Suppose that the user X selects the three sharing targets shown in FIG. 2, the micro-blog information is synchronized to the personal micro-blog of the user X and the personal space of the user X in the Friend network. Further, the micro-blog information is sent to the users corresponding to the object names at the checked status in the notification list. For example, information carrying the content of the micro-blog information is sent to "my space dynamic" of the each QQ zone of the users, It should be noted that for the friend group name and sub-group names at the checked statues in the notification list, sending information to each user. In addition, if there are the users with the same name, for example, a friend name at the checked status in the notification list is the same to a user's name in the friend group at the checked status in the notification list, the information is only sent to the user once, Moreover, that how to synchronize and how to send information are the prior art.

Further, the micro-blog information published by the user X is shared. The synchronizing the micro-blog information to the personal micro-blog of the user X is equivalent to publishing the micro-blog information again, of which the benefit is that the information in the micro-blog can be displayed in chronological order. New published information is on a top of the information published before, which is easier to be seen by other users.

So far, the above-mention contents describe the embodiments of the information sharing method.

Figure 5:
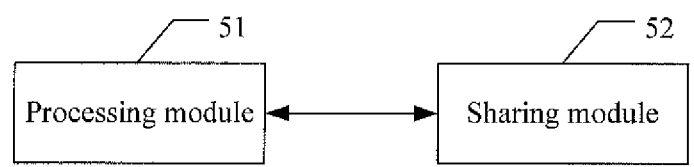
FIG. 5 is a structure diagram of an example of an apparatus for sharing information according to various embodiments.

Based on the above-mentioned contents, referring to FIG. 5, it is a structure diagram of an example of an apparatus for sharing information according to various embodiments. The apparatus includes a processing module 51 and a sharing module 52.

The processing module 51 is used to receive the sharing instruction sent by the user X, and display the selection box including one or more sharing targets. Wherein the selection box displays one sharing target or multiple sharing targets. Each sharing target corresponding to one social network, to prompt the user X to select. The social network Y where the information Z is published by the user X is included in the social network corresponding to the displayed sharing target.

The sharing module 52 is used to receive a selection of one sharing target from the selection box, and send the information Z to the sharing target selected by the user X from the selection box when receiving a submission instruction from the user X.

Specifically, each sharing target may be defined as the following contents.

Friends of the user X in the first social network.

A personal space of the user X in the second social network.

A personal space of the user X in the third social network. Or/And

Further, the sharing target box can display the search link.

If the sharing target selected by the user X is the friends of the user X in the first social network, and the user X clicks the search link, the processing module 51 converts the search link into the search box, and displays the object names of all users who have friend relationships with the user X in the first social network, to prompt the user X to select. The object names may include friend names, friend group names, group names, sub-group names. The sharing module 52 sends the information Z to the users corresponding to the object names selected by the user X when receiving the submission instruction from the user X.

Or, if the sharing target selected by the user X is the friends of the user X in the first social network, and the user X clicks the search link, the processing module 51 converts the search link into the search box. And when the user X inputs the keywords in the searching box, the right side of the selection box displays the all object names corresponding to users who have friend relationships with the user X and satisfy the input keywords in the first social network, to prompt the user X to select. The object names may include friend names, friend group name, group names, sub-group names. The sharing module 52 sends the information Z to the users corresponding to the object names selected by the user X from the selection box when receiving the submission instruction from the user X.

The sharing target selection box further displays the notification list.

Correspondingly, the processing module 51 is further used to save the object names selected by the user X into the notification list. The sharing module 52 is used to send the information Z to the users corresponding to the object names selected by the user X.

The notification list displays object names of the N users who received the information Z shared by the user X in the notification list by default, to prompt the user to select. A time interval between the current time and the information sharing time of each of the N users is the shortest. N is a positive integer.

Correspondingly, the sharing module 52 is further used to send the information Z to the users corresponding to the object names selected by the user X from the N object names displayed by default.

The sharing module 52 is further used to obtain the information Z from the first network application platform, and send the information Z to one or multiple second network application platform when receiving the submission instruction from the user X. Owing to the second network application platform sends the information Z to the social network which the sharing target belongs to, The first network application platform supplies the social network Y. The second network application platform supplies one or multiple social networks which the sharing target belongs to, The sharing target is selected by the user X from the selection box.

In practice, the modules of the apparatus can be located in an instant messaging client or an instant messaging server. For example, the processing module 51 is located in the instant messaging client. The sharing module 52 is located in the instant messaging server. The sharing module 52 located in the instant messaging server receives the submission instruction from the processing module 51 located in the instant messaging client, and sends the information Z to the second network application platform. The second network application platform sends the information Z to the social network which the sharing target belongs to. As another example, the processing module 51 and the sharing module 52 are located in the instant messaging client. The sharing module 52 located in the instant messaging client sends the information Z to the second network application platform located in the instant messaging server. The second network application platform located in the instant messaging server sends the information Z to the social network which the sharing target belongs to. The second network application platform supplies one or multiple social network which the sharing target belongs to.

A person having ordinary skills in the art can realize that the modules of the embodiment can be distributed in the apparatus of the embodiment according to the description of the above-mentioned embodiment. A person having ordinary skills in the art can also realize that the modules of the embodiment can be distributed in one or multiple apparatus. The modules of the above-mentioned embodiment can be combined into one module, or split into multiple sub-modules. A work process of the apparatus of the embodiment shown in Fig. 5 can refer to the corresponding method described in the foregoing description of the embodiment, not repeat it here.

Figure 6:
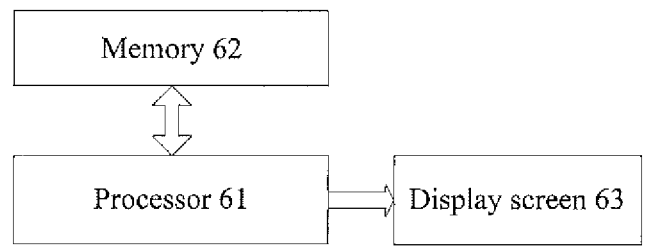
FIG. 6 is a structure diagram of an example of a computer device for sharing information according to various embodiments.

Referring to FIG. 6, it is a structure diagram of an example of a computer device for sharing information according to various embodiments, The device includes a processor 61, a memory 62, and a display screen 63, The memory 62 stores computer instructions. The computer instructions make the processor 61 implement the following operations.

For the information Z published by the user X on the social network Y, the display screen 63 receives the sharing instruction by the user X, and displays the selection box including the sharing target for the user X selecting when the display screen 63 receives the sharing instruction from the user X. Wherein the display screen 63 displays one or multiple sharing targets. Each sharing target corresponding to one social network, to prompt the user X to select. The social network Y where the information Z published by the user X is included in the social networks corresponding to the displayed sharing targets.

When receiving a submission instruction from the user X, sending the information Z to the sharing target selected by the user X from the selection box.

Specifically, each sharing target may be defined as the following contents.

Friends of the user X in the first social network.

A personal space of the user X in the second social network. Or/And

A personal space of the user X in the third social network.

The memory 62 is further used to store computer instructions. The computer instructions make the processor 61 implement the following operations, The display screen 63 further displays a search link in the sharing target box.

If the sharing target selected by the user X is the friends of the user X in the first social network, and the user X clicks the search link, the search link is converted into the search box, and the display screen 63 displays the object names of all users who have friend relationships with the user X in the first social network, to prompt the user X to select, The object names may include friend names, friend group names, group names, sub-group names. When receiving the submission instruction from the user X, sending the information Z to the users corresponding to the object names selected by the user X.

Or, if the sharing target selected by the user X is the friends of the user X in the first social network, and the user X clicks the search link, the search link is converted into the search box. And when the user X inputs the keywords in the searching box, the display screen 63 displays the all object names which have friend relationships with the user X and satisfy the input keywords in the first social network in the right side of the selection box, to prompt the user X to select. The object names may include friend names, friend group names, group names, sub-group names. When receiving the submission instruction from the user X, sending the information Z to the users corresponding to the object names selected by the user X, The memory 62 further stores computer instructions. The computer instructions make the processor 61 implement the following operations.

The display screen 63 further displays the notification list,

Correspondingly, the object names selected by the user X are saved into the notification list. The information Z is sent to the users corresponding to the object names saved into the notification list.

The display screen 63 displays the object names of the N users who received the information shared by the user in the notification list by default, to prompt the user to select. A time intervals between the current time and the information sharing time of each of the N users is the shortest. N is a positive integer.

Correspondingly, the information Z is sent to the users corresponding to the object names selected by the user X from the N object names displayed by default, Above all, adopting the present invention, the user can share information published on a social network to other social networks, thereby speeding up the promotion of the information. And, the user can only do some simple operations, such as sending relevant instructions, to achieve the promotion of the information, which is simple and convenient.

The above-described contents are only the preferred embodiment of the present invention; it is not intended to limit the present invention. Within the spirit and principles of the present invention, any change, equivalent replacement, improvement, etc., should be included in the present invention, within the scope of protection.

What is claimed is:

1. An information sharing method, comprising:
receiving a sharing instruction from a client user to re-share preset information that was previously shared by the client user on a first social media network service when the client user selects a sharing button corresponding to and displayed with the preset information;
displaying a sharing reason inputting box when the sharing instruction is received from the client user;
displaying a selection box when the client user selects an icon that is displayed with the sharing reason inputting box, the selection box comprising a plurality of social media network services accessible via the Internet for selection as a re-sharing target by the client user, the plurality of social media network services including the first social media network service where the preset information was previously shared by the client user;
receiving a selection of two or more of the plurality of social media network services as the re-sharing target from the selection box, the two or more of the plurality of social media network services including the first social media network service where the preset information was previously shared by the client user; and
sending the preset information to the two or more of the plurality of social media network services selected as the re-sharing target from the selection box when receiving a submission instruction from the client user.

2. The method of claim 1, further comprising:
displaying a search link in the selection box;
when the re-sharing target selected by the client user is friends of the client user in a second social media network service of the plurality of social media network services, the sending the preset information to the re-sharing target comprises:
converting the search link into a search box when the client user clicks the search link;
displaying object names of a first group of users who have friend relationships with the client user in the second social media network service, and prompting the client user to select at least one of the object names; the object names comprising one or a combination of friend names, friend group names, group names, sub-group names;
sending the preset information to the first group of users corresponding to the at least one of the object names selected by the client user, when receiving the submission instruction from the client user.

3. The method of claim 2, further comprising:
displaying a notification list in the selection box, and saving the at least one of the object names selected by the client user into the notification list;
sending the preset information to users corresponding to the at least one of the object names selected by the client user.

4. The method of claim 1, further comprising:
displaying a search link in the selection box;
when the re-sharing target selected by the client user is friends of the client user in a second social media network service of the plurality of social media network services, the sending the preset information to the sharing target comprises:
converting the search link into a search box when the client user clicks the search link,
displaying object names of a second group of users who have friend relationships with the client user and satisfy an input keyword in the second social media network service when the client user inputs the keyword in the search box, and prompting the client user to select at least one of the object names; the object names comprising one or a combination of friend names, friend group names, group names, sub-group names;
sending the preset information to the second group of users corresponding to the at least one of the object names selected by the client user, when receiving the submission instruction from the client user.

5. The method of claim 4, further comprising:
displaying a notification list in the selection box, and saving the at least one of the object names selected by the client user into the notification list;
sending the preset information to users corresponding to the at least one of the object names selected by the client user.

6. The method of claim 5, further comprising:
displaying object names of a plurality of users from a group of users in the notification list by default, the plurality of users having received other preset information shared by the client user previously, the group of users comprising, a first group of users or a second group of users;
prompting the client user to select at least one object name from the object names displayed in the notification list; a time interval between current time and information sharing time of each of the plurality of users being the shortest;
sending the preset information to a user corresponding to the at least one object name selected by the client user.

7. The method of claim 1, wherein
when the re-sharing target selected from the selection box is the first social network where the preset information was previously shared by the client user, the preset information is republished on a same user page of the first social network such that the preset information is displayed before other preset information that was shared after the preset information was previously shared.

8. The method of claim 1, wherein the plurality of social media network services includes a microblog service and a social network service.

9. The method of claim 1, further comprising:
displaying a list of friends of the client user in a social network service of the two or more of the plurality of social media network services for selection by the client user, wherein the sending includes sending the preset information to the selected friends of the social network service when receiving the submission instruction from the client user.

10. An information sharing apparatus, comprising:
a processor;
a memory storing a plurality of instructions, the plurality of instructions when executed by the processor causing the processor to:
receive a sharing instruction from a client user to re-share preset information that was previously shared by the client user on a first social media network service when the client user selects a sharing button corresponding to and displayed with the preset information,
display a sharing reason inputting box when the sharing instruction is received from the client user,
display a selection box when the client user selects an icon that is displayed with the sharing reason inputting box, the selection box comprising a plurality of social media network services accessible via the Internet for selection as a re-sharing target by the client user, the plurality of social media network services including the first social media network service where the preset information was previously shared by the client user,
receive a selection of two or more of the plurality of social media network services as the re-sharing target from the selection box, the two or more of the plurality of social media network services including the first social media network service where the preset information was previously shared by the client user, and
send the preset information to the two or more of the plurality of social media network services selected as the re-sharing target from the selection box when receiving a submission instruction from the client user.

11. The apparatus of claim 10, wherein
a search link is displayed in the selection box;
when the re-sharing target selected by the client user is friends of the client user in a second social media network service of the plurality of social media network services, the plurality of instructions further causes the processor to:
convert the search link into a search box and display object names of a first group of users who have friend relationships with the client user in the second social media network service, and prompt the client user to select at least one of the object names, when the user clicks the search link; the object names comprising one or a combination of friend names, friend group names, group names, sub-group names; and
send the preset information to the first group of users corresponding to the at least one of the object names selected by the client user, when receiving the submission instruction from the client user.

12. The apparatus of claim 11, wherein
a notification list is displayed in the selection box, and the plurality of instructions further cause the processor to:
save the at least one of the object names selected by the client user into the notification list; and
send the preset information to users corresponding to the at least one of the object names selected by the client user.

13. The apparatus of claim 10, wherein
a search link is displayed in the selection box;
when the re-sharing target selected by the client user is friends of the client user in a second social media network service of the plurality of social media network services, the plurality of instructions further causes the processor to:
convert the search link into a search box when the client user clicks the search link, and to display object names of a second group of users who have friend relationships with the client user and satisfy an input keyword in the second social media network service, and prompt the client user to select at least one of the object names, when the client user inputs the keyword in the search box; the object names comprise one or a combination of friend names, friend group names, group names, sub-group names; and
send the preset information to the second group of users corresponding to the at least one of the object names selected by the client user, when receiving the submission instruction from the client user.

14. The apparatus of claim 13, wherein
a notification list is displayed in the selection box, and
the plurality of instructions further causes the processor to:
save the at least one of the object names selected by the client user into the notification list; and
send the preset information to users corresponding to the at least one of the object names selected by the client user.

15. The apparatus of claim 12, wherein
object names of a plurality of users from a group of users are displayed in the notification list by default, to prompt the client user to select at least one object name from the object names displayed in the notification list, the plurality of users having received other preset information shared by the client user previously, the group of users comprising a first group of users or a second group of users, a time interval between current time and information sharing time of each of the plurality of users is the shortest; and
the plurality of instructions further causes the processor to send the preset information to a user corresponding to the at least one object name selected by the client user.

16. A non-transitory computer-readable medium storing a program which when executed by a processor causes the processor to perform:
receiving a sharing instruction from a client user to re-share preset information that was previously shared by the client user on a first social media network service when the client user selects a sharing button corresponding to and displayed with the preset information;
displaying a sharing reason inputting box when the sharing instruction is received from the client user;
displaying a selection box when the client user selects an icon that is displayed with the sharing reason inputting box, the selection box comprising a plurality of social media network services accessible via the Internet for selection by the client user, the plurality of social media network services including the first social media network service where the preset information was previously shared by the client user;
receiving a selection of two or more of the plurality of social media network services as the re-sharing target from the selection box, the two or more of the plurality of social media network services including the first social media network service where the preset information was previously shared by the client user: and
sending the preset information to the two or more of the plurality of social media network services selected as the re-sharing target from the selection box when receiving a submission instruction from the client user.

17. The non-transitory computer-readable medium of claim 16, wherein the program when executed by the processor further causes to computer to perform:
displaying a search link in the selection box of the display screen;
converting the search link into a search box when the client user clicks the search link, and displaying object names of a first group of users who have friend relationships with the client user in a second social media network service of the plurality of social media network services, and prompting the client user to select at least one of the object names, when the re-sharing target selected by the client user is friends of the user in the second social media network service; the object names comprising one or a combination of friend names, friend group names, group names, sub-group names; and
sending the preset information to the first group of users corresponding to the at least one of the object-names selected by the client user, when the submission instruction from the client user is received.

18. The non-transitory computer-readable medium of claim 16, wherein the program when executed by the processor further causes to computer to perform:
displaying a search link on the display screen;
converting the search link into a search box when the client user clicks the search link, and displaying object names of a second group of users who have friend relationships with the client user and satisfying an input keyword in a second social media network service of the plurality of social media network services when the client user inputs the keyword in the search box, and prompting the client user to select at least one of the object names, when the re-sharing target selected by the client user is friends of the client user in the second social media network service; the object names comprising one or a combination of friend names, friend group names, group names, sub-group names; and
sending the preset information to the second group of users corresponding to the at least one of the object names selected by the client user, when receiving the submission instruction from the client user.

19. The non-transitory computer-readable medium of claim 18, wherein the program when executed by the processor further causes to computer to perform:
displaying a notification list on the display screen, and saving the at least one of the object names selected by the client user into the notification list;
sending the preset information to users corresponding to the at least one of the object names selected by the client user.

20. The non-transitory computer-readable medium of claim 19, wherein the program when executed by the processor further causes to computer to perform:
displaying object names of a plurality of users from a group of users in the notification list by default, the plurality of users having received other preset information shared by the client user previously, the group of users comprising a first group of users or a second group of users;

prompting the client user to select at least one object name from the object names displayed in the notification list; a time interval between current time and information sharing time of each of the plurality of users being the shortest;
sending the preset information to a user corresponding to the at least one object name selected by the client user.

\* \* \* \* \*

UNITED STATES PATENT AND TRADEMARK OFFICE
CERTIFICATE OF CORRECTION

PATENT NO. : 10,496,733 B2
APPLICATION NO. : 14/263258
DATED : December 3, 2019
INVENTOR(S) : Zhu Liang et al.

Page 1 of 1

It is certified that error appears in the above-identified patent and that said Letters Patent is hereby corrected as shown below:

On the Title Page

Item (63), the Related U.S. Application Data has been omitted. Item (63) should read:
Related U.S. Application Data
(63) Continuation of application No. PCT/CN2013/074289, filed on Apr. 17, 2013.

Signed and Sealed this
Third Day of March, 2020

Andrei Iancu
*Director of the United States Patent and Trademark Office*